United States Patent [19]
Elkins

[11] Patent Number: 6,033,034
[45] Date of Patent: Mar. 7, 2000

[54] ELECTRICAL, MECHANICAL SYSTEM FOR ACTIVATING A HYDRAULIC BRAKE SYSTEM

[76] Inventor: Bert V. Elkins, 10626 Cerveza Dr., Escondido, Calif. 92026

[21] Appl. No.: 08/938,240

[22] Filed: Sep. 26, 1997

[51] Int. Cl.[7] .............................. B60T 13/74; F16D 65/36

[52] U.S. Cl. .................................. 303/3; 303/7; 188/156

[58] Field of Search ...................... 303/7, 3; 188/112 R, 188/345, 156, 138

[56] References Cited

U.S. PATENT DOCUMENTS

| 242,615 | 6/1881 | Duwelius | 188/138 |
| 3,901,358 | 8/1975 | Dixon | 188/138 |

Primary Examiner—Paul N. Dickson
Assistant Examiner—Robert A. Siconolfi

[57] ABSTRACT

A system that utilizes the frictional force between an electromagnet an a rotating disk to apply a force to a push rod which in turn applies a force on a hydraulic brake cylinder. The system provides controlled variations in the hydraulic pressure in a hydraulic brake system when receiving controlled variations in electrical current.

5 Claims, 2 Drawing Sheets

ELECTRICAL, MECHANICAL SYSTEM FOR ACTIVATING A HYDRAULIC BRAKE SYSTEM

CROSS-REFERENCE TO RELATED APPLICATIONS

There are no related applications.

STATEMENT REGARDING FEDERALLY SPONSORED RESEARCH AND DEVELOPMENT

There is no federally sponsored research and development in regards to this application.

REFERENCE TO A "MICROFICHE APPENDIX"

There are no microfiche in regards to this application.

BACKGROUND OF INVENTION

1. Field of Invention

The number of vehicles towing another vehicle has increased considerably over the past two to three decades. A large amount of this increase is due to the influx of recreational vehicles with drivers having little or no experience in towing another vehicle. Laws have been passed requiring towed vehicles exceeding a certain weight to be equipped with a brake system. The brake system must respond with the brake system of the towing vehicle.

In the past a hydraulic coupling device between the towing vehicle and the towed vehicle was used which allowed for the direct transfer of hydraulic fluid and hydraulic pressure between the brake systems of the two vehicles. With the event of the modern computer controlled brake system, in particular the anti locking brake system, such direct transfer of hydraulic fluid and pressure is not desirable.

Other relatively expensive systems utilizing a vacuum or compressed air to activate a hydraulic brake system on the towed vehicle have been developed and are in use today especially on commercial semi-trucks and trailers.

In relatively recent times all electric brake systems have been devised and are on the market today. The all electric brake system utilizes a small computer control unit in the cab of the towing vehicle to emit an electrical impulse when the brake pedal of the towing vehicle is pressed. An electromagnet in the wheel hub of the towed vehicle is energized by the electric impulse from the towing vehicle which in turn magnetically clamps to the rotating wheel hub. The frictional force between the electromagnet and the wheel hub causes the electromagnet to apply a force to a lever system that rotates a cam which in turn expands the brake shoes against the wheel brake drum. While this system is relatively inexpensive and it does not effect the computerized brake system on today's vehicles, it does have several drawbacks. The electromagnet can be rendered useless if energized under water as can be and has been the case on boat trailers. The system inside the wheel hub is subjected to many harsh environments and chemicals. These harsh environments are corrosive causing the need for short inspection intervals followed with proper repairs. The cam mechanism for expanding the brake shoes against the brake drum was used on cars back in the twenties and thirties. Because of the short distance the cam expands the brake shoes they must be manually adjusted frequently.

Another system in use today, especially on boat trailers, is a system called surge brakes. This system provides a master hydraulic brake cylinder as part of the trailer hitch. The hitch is designed to allow the entire towed vehicle to roll forward a few inches when the brakes on the towing vehicle are applied. As the towed vehicle rolls forward a fixed push rod is pushed into the master hydraulic brake cylinder which creates hydraulic pressure to the hydraulic cylinders in the wheel hubs thereby expanding the brake shoes against the brake drums. While this system is relatively inexpensive and does not effect the brake system on the towing vehicle it does have some major drawbacks. Anytime driving conditions are such that the towed vehicle is caused to roll forward and force the push rod into the master hydraulic brake cylinder the brakes on the towed vehicle are applied even though the brakes on the towing vehicle are not being applied. This occurs when the towing vehicle is backing up, especially on a steep grade. A more dangerous situation can happen on a steep down hill grade when the towing vehicle is gearing down to reduce speed causing the towed vehicle to roll forward thereby applying its brakes. This can cause a control problem and seriously overheat the towing vehicle's brakes. Another drawback occurs when the towing vehicle is backing down a grade. In this case the brakes on the towed vehicle cannot be applied presenting the possibility for the towing vehicle to dragged out of control.

2. Description of Related Art

I have diligently searched past patents and have not found a patent relating to an electrical, mechanical system for activating a hydraulic brake system. I have searched the market place and have not found a system on the market that utilizes an electrical, mechanical system for activating a hydraulic brake system.

BRIEF SUMMARY OF THE INVENTION

My invention provides a simple and inexpensive means of utilizing the electrical impulse from an existing marketed sending unit mounted in the towing vehicle to provide a mechanical force to push a push rod into a master hydraulic cylinder thereby activating the hydraulic brake system on a towed vehicle. My invention bridges the gap between electrical brake systems and hydraulic brake systems that to my knowledge has not been bridged by other inventors. My invention does not effect the brake system on the towing vehicle and can be mounted in a closed housing where it is protected from any harsh environment. Accordingly, several objects and advantages of my invention are:

(a) to provide a means of transposing electrical energy into mechanical energy;

(b) to utilize the mechanical energy so provided to pressurize a hydraulic braking system;

(c) to provide a hydraulic braking system on a towed vehicle that is activated when, and only when, the braking system on the towing vehicle is activated;

(d) to provide a means of activating a hydraulic braking system on a towed vehicle without effecting the braking system on the towing vehicle;

(e) To provide a hydraulic braking force on a towed vehicle that increases or decreases directly as the braking force on the towing vehicle increases or decreases; and (f) to provide protection of the system against harsh environments.

Figure 1:
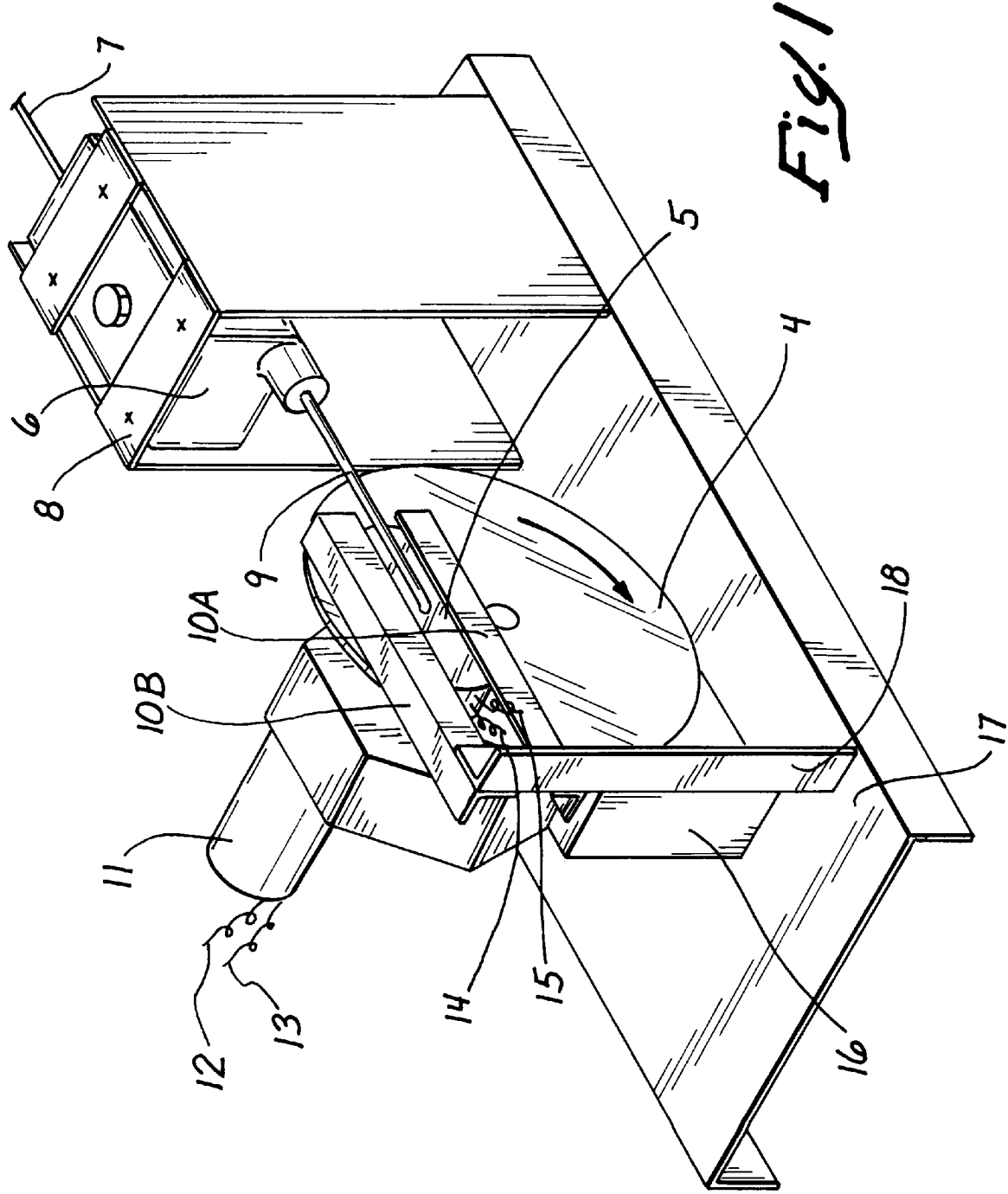
FIG. 1 is an isometric view of one embodiment of my invention.

The simplest embodiment is illustrated in FIG. 1 ISOMETRIC VIEW. The steel disk 4 is attached to the drive shaft of the DC gearmotor 11. The steel disk 4 rotates when the DC gearmotor 11 is energized through the DC gearmotor hot wire 12 and the DC gearmotor ground wire 13. The DC gearmotor is supported and attached to the base 17 by the DC gearmotor support 16. The electromagnet 5 magnetically clamps to the steel disk 4 when the electromagnet is energized through the electromagnet hot wire 14 and the electromagnet ground wire 15. The support guides 10A and 10B support and guide the electromagnet 5. The support guides 10A and 10B are attached to the base 17 by the guide support 18. A push rod 9 in inserted into a hole in the electromagnet 5 and bends 90 degrees to extend into the master hydraulic brake cylinder 6. The master hydraulic brake cylinder 6 is attached to the master hydraulic brake cylinder support 8 which in turn is attached to the base 17. The hydraulic brake line 7 is screwed into the master hydraulic brake cylinder 6.

Figure 2:
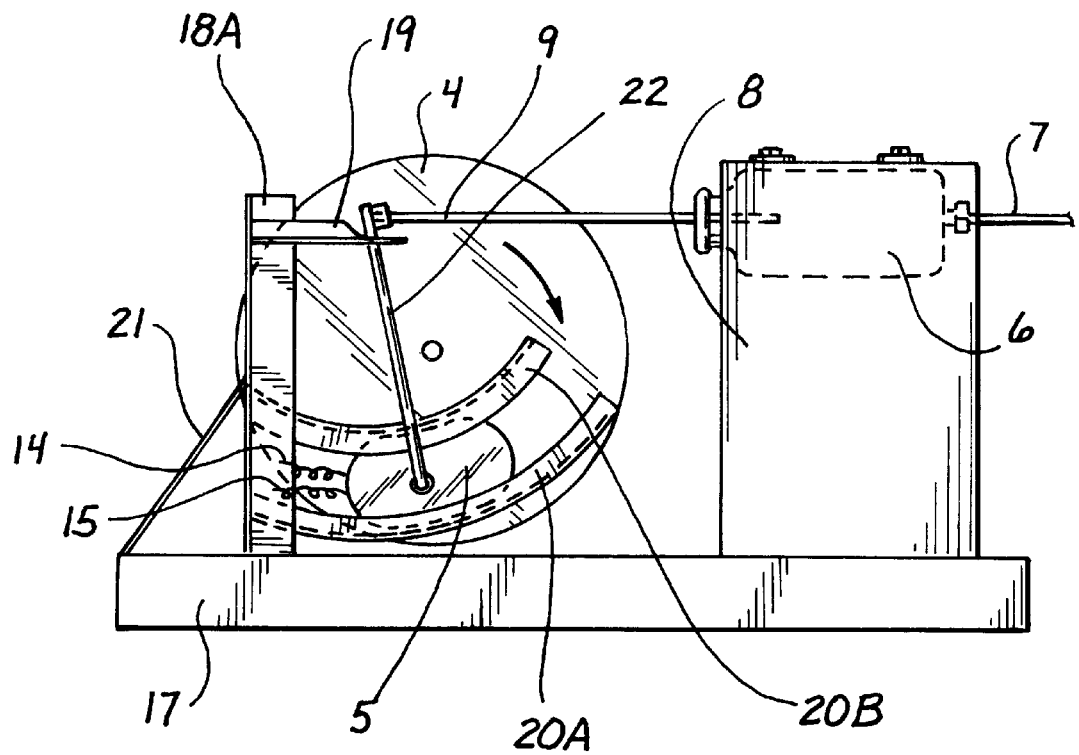
FIG. 2 is a front view of a second embodiment of my invention.

An embodiment capable of providing very high hydraulic pressures is illustrated in FIG. 2 FRONT VIEW. The steel disk 4 is rotated and supported in the same manner as described above for FIG. 1. The electromagnet 5 magnetically clamps to the steel disk 4 when the electromagnet 5 is energized through the electromagnet hot wire 14 and the electromagnet ground wire 15. The curved support guides 20A and 20B support and guide the electromagnet 5. The support guides 20A and 20B are attached to the guide and pivot arm support 18A which in turn is attached to the base 17. Pivot rod 22 is inserted into a hole in the electromagnet 5 and bends 90 degrees to extend up through a U at the end of pivot arm 19. Pivot arm 22 is supported by electromagnet 5. Pivot arm 19 is attache d to the guide an d pivot arm support 18A. Push rod 9 is inserted a into cup at the end of pivot rod 22 and into the master hydraulic brake cylinder 6. The master hydraulic cylinder 6 is attached to the master hydraulic brake cylinder support 8 which in turn is attached to the base 17. A hydraulic brake line 7 is screwed into the master hydraulic brake cylinder 6. A support brace 21 is attached to the guide and pivot arm support 18A and the base 17.

Figure 3:
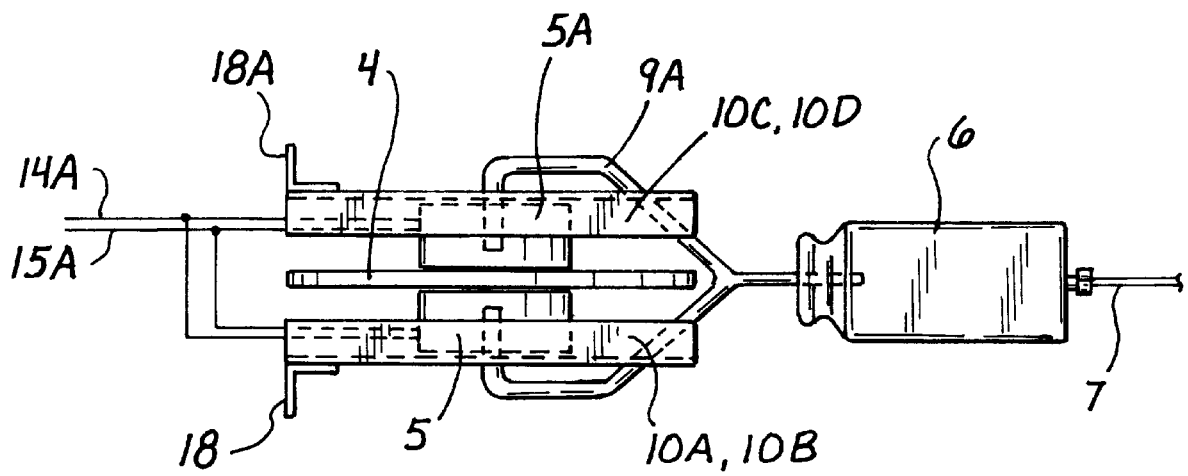
FIG. 3 is a partial top view of a third embodiment of my invention.

A third embodiment of my invention is illustrated by FIG. 3 PARTIAL TOP VIEW. The steel disk 4 is rotated and supported in the same manner as described above for FIG. 1. The master hydraulic brake cylinder 6 is supported in the same manner as described above for FIG. 1 and FIG. 2. The electromagnets 5 and 5A magnetically clamp to the steel disk 4 when the electromagnets 5 and 5A are energized through the electromagnets hot wire 14A and the electromagnets ground wire 15A. The support guides 10A and 10B support and guide the electromagnet 5. The support guides 10A and 10B are attached to the guide support 18. The support guides 10C and 10D support and guide the electromagnet 5A. The support guides 10C and 10D are attached to the guide 18A. The Y shaped push rod 9A is inserted into holes in electromagnets 5 and 5A and extends into the master hydraulic brake cylinder 6. The hydraulic brake line 7 is screwed into the master hydraulic brake cylinder 6.

The three embodiments illustrated in FIG. 1, FIG. 2, FIG. 3 provide three different means of positioning the electromagnet or electromagnets around the rotating disk and thereby providing three different maximum hydraulic pressures. The maximum hydraulic pressure requirements will differ among towed vehicles. Length and diameter of hydraulic brake lines, the number of braking points actuated, size of brake shoes and drums, and weight of the towed load are the major factors determining the maximum hydraulic pressure needed. Obviously there are other means of positioning the electromagnet or electromagnets around the rotating disk to provide different maximum hydraulic pressures. Changing the size and power of the electromagnets will also change the maximum hydraulic pressure attainable for any given embodiment.

The three embodiments illustrated in FIG. 1, FIG. 2, and FIG. 3 utilize a DC gearmotor to rotate the steel disk. Other motors such as AC, hydraulic, and air could be used. The disk does not need to be rotated by a motor. It could be rotated by a belt, chain, or a drive cable powered by one of the trailer wheels or a dummy wheel. A drum or a chain or a conveyor belt could be used instead of the disk.

DETAILED DESCRIPTION OF THE INVENTION

In FIG. 1 the steel disk 4 rotates when the DC gearmotor 11 is energized through the DC gearmotor hot wire 12 and the DC gearmotor ground wire 13. The electromagnet 5 is energized when an electric current is supplied through the electromagnet hot wire 14 and the electromagnet ground wire 15. When the electromagnet 5 is energized it clamps to the steel disk 4. The clamping force of the electromagnet 5 to the steel disk 4 varies directly with the amount of current supplied to the electromagnet 5. The frictional force between the electromagnet 5 and the steel disk 4 causes the electromagnet 5 to move within it support guides 10A and 10B thereby applying a force to push rod 9. The push rod 9 is forced into the master hydraulic brake cylinder 6 thereby setting up a hydraulic pressure in the master hydraulic brake cylinder 6. The hydraulic pressure in the master hydraulic brake cylinder 6 is transmitted through the hydraulic brake line 7 to any point within a hydraulic brake system. The amount of hydraulic pressure within the hydraulic brake line 7 and the master hydraulic brake cylinder 6 varies directly with the amount of force produced by push rod 9 which is directly related to the frictional force between the electromagnet 5 and the steel disk 4. The frictional force varies with the clamping force of the electromagnet 5 to the rotating disk 4 which is controlled by the amount of current supplied to the electromagnet 5. The rotational force of the steel disk 4 must always be grater than the frictional force between the electromagnet 5 and the steel disk 4 so that the steel disk 4 rotates continuously. When the electromagnet 5 is de-energized the hydraulic pressure in the master hydraulic brake cylinder moves the electromagnet 5 back to its starting position.

In FIG. 2 the steel disk rotates as described above for FIG. 1. The electromagnet 5 is energized when an electric current is supplied through the electromagnet hot wire 14 and the electromagnet ground wire 15. When the electromagnet 5 is energized it clamps to the steel disk 4. The clamping force of the electromagnet 5 to the steel disk 4 varies directly with the amount of current supplied to the electromagnet 5. The frictional force between the electromagnet 5 and the steel disk 4 causes the electromagnet 5 to move within its curved support guides 20A and 20B. As the electromagnet in its curved path the pivot rod 22 rotates around a pivot point at the end of pivot arm 19 thereby forcing push rod 9 into the master hydraulic brake cylinder 6. The curved support guides 20A and 20B are designed to keep the length of the pivot rod 22 between the electromagnet 5 and the pivot arm 19 constant. As push rod 9 is forced into the master hydraulic brake cylinder 6 a hydraulic pressure is generated in the master hydraulic brake cylinder 6 which in turn is transmitted through the hydraulic brake line 7 to any point within a hydraulic brake system. The amount of hydraulic pressure generated in the master hydraulic brake cylinder depends on the amount of frictional force created between the electromagnet 5 and the steel disk 4 and the ratio of the lengths of the pivot rod 22 above and below the pivot arm 19.

In FIG. 3 the steel disk rotates as described above for FIG. 1. The electromagnets 5 and 5A are energized when an electric current is supplied through the electromagnets hot wire 14A and the electromagnets ground wire 15A. When the electromagnets 5 and 5A are energized they clamp to the steel disk 4. The frictional force between the electromagnets 5 and 5A and the steel disk 4 causes the electromagnets 5 and 5A to move within their support guides 10A, 10B, 10C, and 10D thereby applying a force to the Y shaped push rod 9A. The Y shaped push rod 9A is forced into the master hydraulic brake cylinder 6 thereby generating a hydraulic pressure in the master hydraulic brake cylinder 6 and the hydraulic brake line 7.

Accordingly this invention provides a means of producing controlled variations of the hydraulic pressure in a hydraulic brake system by receiving controlled variations in electrical current. These varying controlled electric currents are usually supplied from a computer unit capable of increasing or decreasing the electric current in accordance with the braking force desired.

When mounted on a towed vehicle equipped with hydraulic brakes this invention will activate the towed vehicle's hydraulic brakes by receiving an electric current from the towing vehicle. The amount of electrical current received will vary directly with the braking demand of the towing vehicle and the amount of braking power on the towed vehicle will vary accordingly. Furthermore, this has additional advantages in that it;

(a) provides a means of activating the hydraulic brake system on a towed vehicle when, and only when, the braking system on the towing vehicle is activated;

(b) provides a means of activating a hydraulic brake system on a towed vehicle without effecting the braking system on the towing vehicle and;

(c) can be enclosed for protection against harsh environments.

Although the description above contains many specifications, these should not be construed as limiting the scope of the invention but as merely providing illustrations of the preferred embodiments of the invention, There are numerous means of placing electromagnets around the rotating disk and providing lever systems or the like to multiply the frictional force set up between the electromagnet and the rotating disk. The steel disk can be rotated by other types of motors such as hydraulic and air. It can also be rotated by other means such as a chain or belt system driven by a sprocket or pulley on one of the towed vehicle's wheels or a dummy wheel. The steel disk could be; (1) a steel drum with the electromagnet curved to fit the drum surface, (2) a roller chain with smooth surface connecting lengths or, (3) a metal impregnated belt. Instead of using electromagnet support guides the push rod could be supported in a manner that would support and guide the movement of the electromagnet. In FIG. 2 a fixed ball and socket pivot on the end of the pivot arm could be used to support the pivot rod and electromagnet instead or the curved electromagnet support guides.

While the description above primarily addresses the application of the invention for controlling the hydraulic brake system on a towed vehicle the invention has application in industry and other areas where the need to control the speed of moving equipment exist.

Thus the scope of the invention should be determined by the appended claims and there legal equivalents, rather than the examples given.

I claim:

1. An electrical-mechanical system for providing hydraulic pressure to a hydraulic brake system with multiple hydraulic brake units, the system comprising:

a disk; said disk is not associated with or attached to a wheel;

means for rotating said disk in one rotational direction;

at least one electromagnet positioned for frictionally engaging said disk when said electromagnet is energized by electrical current, whereby said electromagnet is caused to move longitudinally;

a master hydraulic brake cylinder;

brake fluid line operatively connected between said master hydraulic brake cylinder and said multiple hydraulic brake units;

means for transferring movement of said electromagnet to said master hydraulic brake cylinder.

2. The system in accordance with claim 1, further comprising guide means for supporting and guiding said electromagnet.

3. The system in accordance with claim 2, wherein said means for transferring movement of said electromagnet to said master hydraulic brake cylinder comprises a push rod.

4. The system in accordance with claim 2, wherein said means for transferring movement of said electromagnet to said master hydraulic brake cylinder comprises a pivot rod and a push rod.

5. An electrical-mechanical system for activating a hydraulic brake system on a trailer having multiple wheels and being towed by a towing vehicle having a braking system, the electrical-mechanical system comprising:

a disk; said disk is not associated with or attached to a wheel;

means for rotating said disk in one rotational direction;

at least one electromagnet positioned for frictionally engaging said disk when said electromagnet is energized by electrical current received from said towing vehicle when said braking system on said towing vehicle is activated, whereby said electromagnet is caused to move longitudinally;

a master hydraulic brake cylinder;

a brake fluid line operatively connected between said master cylinder and the trailer brakes;

a push rod for exerting force on said master hydraulic brake cylinder; and means for transferring longitudinal movement of said electromagnet to said push rod.

* * * * *